United States Patent [19]

Senoo

[11] 4,442,609
[45] Apr. 17, 1984

[54] VEHICLE ORIENTATION DETECTING DEVICE FOR AN AUTOMOTIVE VEHICLE OR ANOTHER VEHICLE

[75] Inventor: Tetsuo Senoo, Inagi, Japan

[73] Assignee: Nissan Motor Company, Limited, Kanagawa, Japan

[21] Appl. No.: 305,349

[22] Filed: Sep. 23, 1981

[30] Foreign Application Priority Data

Sep. 25, 1980 [JP] Japan .................. 55-132369

[51] Int. Cl.³ .................. G01C 17/30; G01C 17/38
[52] U.S. Cl. .................. 33/356; 33/362
[58] Field of Search .................. 33/333, 356, 362

[56] References Cited

U.S. PATENT DOCUMENTS

| | | | |
|---|---|---|---|
| 1,774,458 | 8/1930 | Tear | 33/362 |
| 2,036,444 | 4/1936 | Tolson | 33/362 |
| 2,464,057 | 3/1949 | Phair | 33/362 |
| 4,139,951 | 2/1979 | Cunard et al. | 33/362 |

FOREIGN PATENT DOCUMENTS

| | | | |
|---|---|---|---|
| 500645 | 6/1930 | Fed. Rep. of Germany | 33/362 |
| 538030 | 7/1941 | United Kingdom | 33/362 |
| 539817 | 9/1941 | United Kingdom | 33/362 |

Primary Examiner—Richard R. Stearns
Attorney, Agent, or Firm—Lowe, King, Price & Becker

[57] ABSTRACT

A vehicle orientation detecting device mounted in an automotive or other vehicle cancels an erroneous signal component of a first alternating voltage signal generated as a conductor is rotated so as to intersect a geomagnetic field. The erroneous component is cancelled by electrically adjusting two phases and magnitudes of a second alternating voltage signal having the same period as the rotating conductor and a 90° phase shifted second alternating voltage. The vehicle orientation is correctly derived from the phase difference between the normal first alternating voltage signal without the erroneous signal component and the second alternating voltage signal.

14 Claims, 6 Drawing Figures

VEHICLE ORIENTATION DETECTING DEVICE FOR AN AUTOMOTIVE VEHICLE OR ANOTHER VEHICLE

BACKGROUND OF THE INVENTION

(1) Field of the Invention

The present invention relates generally to a vehicle orientation detecting device for an automotive vehicle or another vehicle which derives a directional representative signal with respect to the orientation of a geo-magnetic field, and more particularly to a vehicle orientation detecting device mounted in the automotive vehicle which provides an accurate directional indication by correcting an error caused by the magnetism of the vehicle itself in the vicinity of the vehicle orientation detection device with a circuitry.

(2) Description of the Prior Art

When a vehicle orientation detecting device is mounted in, e.g. an automotive vehicle, there arises a problem in that the vehicle body has a magnetism with a direction and magnitude particular to the vehicle body; the vehicle body magnetism has an effect on the indication of the vehicle orientation detecting device.

To correct such an erroneous indication of the vehicle orientation caused by the magnetism of the vehicle body, various error correcting means for the vehicle orientation detecting device have been considered.

For example, a permanent magnet has been installed in the vicinity of a geo-magnetism detecting coil of a vehicle orientation detecting device. The permanent magnet produces a magnetic field having the same magnitude and opposite direction as the magnetism of the vehicle body so that the effect of the vehicle body magnetism acting on the geomagnetism detecting coil is cancelled. However, the positioning of the permanent magnet is time-consuming and complicated since the vehicle must be placed at one of two mutually orthogonal directions, i.e. north-south, and east-west, to adjust the position of the permanent magnet. In addition, once the magnet has been positioned, the position of the permanent magnet can drift due to the temperature changes and fluctuations of the vehicle body, etc.

As another example, the permanent magnet is replaced by an electromagnetic coil having two wires wound around a disc-shaped core so as to intersect at right angles. The vehicle body magnetism is cancelled by adjusting the magnitude and direction of currents flowing through each wire of the electromagnetic coil. Although positioning of the electromagnetic coil itself is not necessary, such electromagnetic coil has the disadvantage of requiring currents as large as 500 to 800 mA, assuming that each wire has about 1000 turns. Supplying such current magnitudes the electromagnetic coil at a power supply voltage of about 100 V, as is necessary for this purpose, heats the electromagnetic coil excessively. Consequently, a cooling means must be installed for the electromagnetic coil, an impractical requirement for the vehicle.

Therefore, as described above, the conventional means for canceling the influence by the vehicle body magnetism are complex in positioning or construction.

SUMMARY OF THE INVENTION

With the above-described problem in mind, it is an object of the present invention to provide a vehicle orientation detecting device wherein an electronic circuit uses a simple adjustment network having variable resistors for canceling an error signal component included by vehicle body magnetism on a geo-magnetism direction detecting signal generated by a geo-magnetism direction detecting coil that is rotated so as to intersect the geo-magnetic field to provide an accurate geo-magnetism direction detecting signal.

This is achieved by appropriately combining an alternating voltage signal which is synchronized with the rotation of the geo-magnetism direction detecting coil and a 90°-phase shifted replica thereof. The signal and replica are combined by means of two variable resistors so as to provide a resultant signal having the same magnitude and opposition direction as the error signal component of the geo-magnetism direction detecting signal. The combined resultant signal is added to the geo-magnetism direction detecting signal to produce a correct geo-magnetic direction detecting signal when the vehicle is oriented in a predetermined direction.

BRIEF DESCRIPTION OF THE DRAWINGS

The features and advantages of the vehicle orientation detecting device according to the present invention will be appreciated from the following description taken in conjunction with the drawings wherein like reference numerals designate the corresponding elements, and in which.

DETAILED DESCRIPTION OF THE PREFERRED EMBODIMENTS

Figure 1:
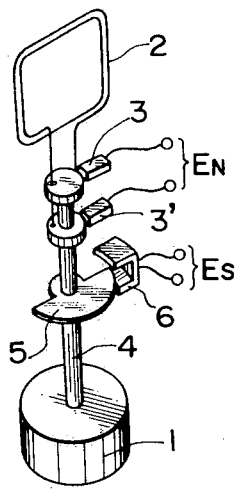
FIG. 1 is a perspective view illustrating an geo-magnetism detecting section of a vehicle orientation detecting device of a first preferred embodiment according to the present invention.

Reference is now made to the drawings, and first to FIG. 1, a perspective view of a geo-magnetism detecting section of a vehicle orientation detecting device of a first preferred embodiment according to the present invention.

As shown in FIG. 1, the geo-magnetism detecting section comprises: (a) a motor 1 having an output shaft rotating at a constant speed; (b) a conductive wire 2 which forms a coil rotated by the motor 1; (c) a pair of brushes 3, each connected to an end of the wire 2 from which an geo-magnetism direction detecting signal (alternating voltage signal) $E_N$, obtained from an electromotive force generated when the wire 2 is rotated to transverse the direction of the magnetic field of the earth; (d) a semi-circular rotating disc 5 attached to a rotating shaft 4 of the motor 1; and (e) a photo coupler 6 from which a rectangular pulse signal $E_S$ is derived whenever the disc 5 passes through a light path of the photo coupler 6. The bias voltage of the photo coupler 6 is not shown in FIG. 1. The direction of the geo-magnetic field may be deemed as north.

Figure 2:
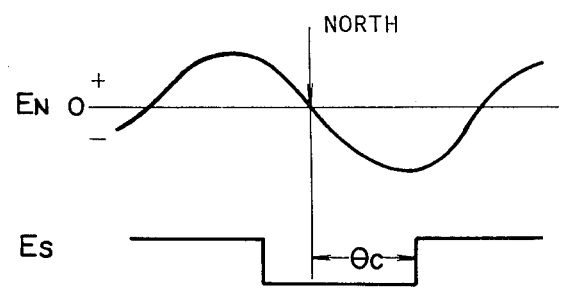
FIG. 2 is an illustration of a relationship between two output waveforms of the geo-magnetism detecting section shown in FIG. 1.

As shown in FIG. 2, when the coil wire 2 is rotates and the elongated direction of the wire 1 is aligned with that of the geo-magnetic field, the geo-magnetism direction detecting signal $E_N$ switches from a positive potential to a negative one, and vice versa.

A phase difference between the leading edge of the rotational position detecting signal $E_S$ and switching time of the geo-magnetism direction detecting signal $E_N$ denotes the vehicle orientation with respect to north (the direction of geo-magnetic field). If the vehicle is oriented in a direction at which a predetermined phase difference $\phi_c$ is indicated, the vehicle orientation detecting device determines that the vehicle is oriented north.

Figure 3:
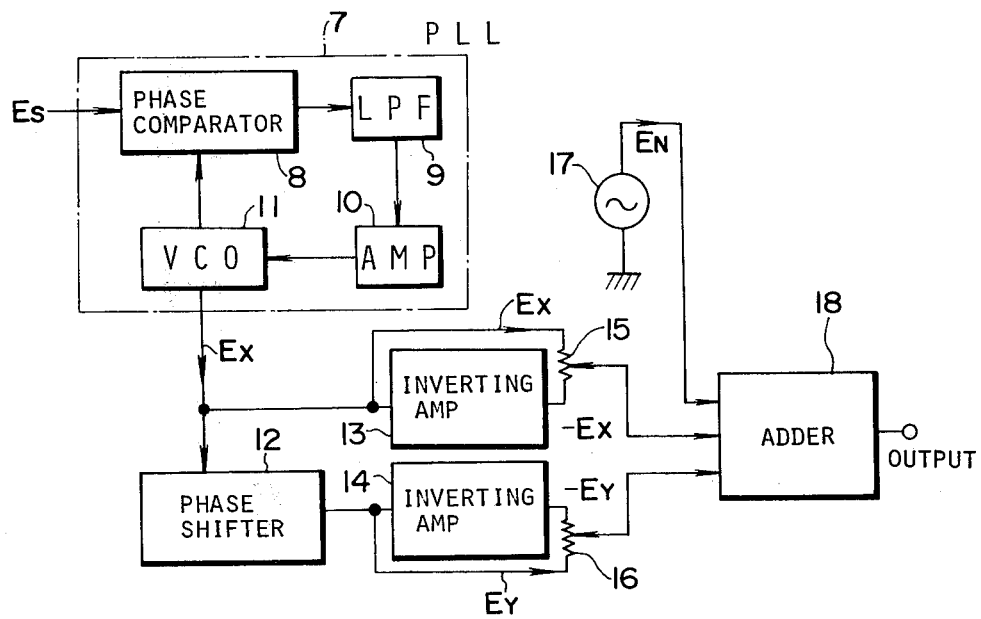
FIG. 3 is a block diagram of an internal circuit for canceling an error caused by the vehicle body magnetism of the first preferred embodiment.

FIG. 3 is a schematic diagram of an internal circuit for canceling an error caused by the vehicle body magnetism on the vehicle orientation detecting device of the first preferred embodiment.

In FIG. 3, phase locked loop circuit (PLL) 7 comprises a phase comparator 8, low pass filter (LPF) 9, amplifier (AMP) 10, and voltage-controlled oscillator (VCO) 11. The reason for using the PLL circuit in the first preferred embodiment is to obtain an alternating voltage signal $E_X$ that is accurately synchronized with the rectangular pulse signal $E_S$ since the signal $E_S$ outputted from the photo coupler 6 is a rectangular pulse having a repetition rate corresponding to the rotation period of coil wire 2. Phase shifter 12 shifts the alternating voltage signal $E_X$ supplied to it by PLL 7 by 90° to derive an alternating voltage signal $E_Y$. First and second inverting amplifiers 13 and 14, e.g. of the operational amplifier type, derive outputs that are inverted (i.e. 180°-phase shifted) with respect to the inputs thereof, amplifiers 13 and 14 derive alternating voltage signals $-E_X$ and $-E_Y$. A first variable resistor 15 is connected between the input and output terminals of the first inverting amplifier 13 for adjusting the output absolute voltage value and polarity of the first inverting amplifier 13 to provide an alternating voltage signal $E_X$ ranging in voltage from $-E_X$ to $+E_X$. A second variable resistor 16 is connected between the input and output terminals of the second inverting amplifier 14 for adjusting the output absolute voltage value and polarity of the second inverting amplifier 14 to provide an alternating voltage signal $E_Y$ ranging in voltage from $-E_Y$ to $+E_Y$. A signal generator 17 derives an alternating geo-magnetism direction detecting signal $E_N$ generator 17 includes a rotating coil wire 2 and brushes 3 and 3', such as shown in FIG. 1. The signal $E_N$ derived from the signal generator 17 includes an error signal component caused by the vehicle body magnetism. An adder 18 having, e.g., an operational amplifier, adds the geo-magnetism direction detecting signal $E_N$ to the alternating signals $E_X$ and $E_Y$ in such a way that the error signal component is cancelled. The adder 18 may be replaced with a subtractor. The rotational position detection signal $E_S$ (rectangular pulse) is fed into the phase locked loop circuit (PLL) 7, which converts it into an alternating voltage signal Ex, having a phase corresponding to the rotational position detection signal $E_S$. Signal Ex is fed to the first variable resistor 15 together with an alternating voltage signal $-E_X$ derived by the inverting amplifier 13. The phase shifter 12 derives an alternating voltage signal $E_Y$ by shifting the phase of the alternating voltage signal $E_X$ by 90°. The 90°-phase shifted alternating signal $E_Y$ is fed to the second variable resistor 16 together with the alternating voltage signal $-E_Y$ derived by the second inverting amplifier 14. In this way, the four signals $E_X$, $-E_X$, $E_Y$, and $-E_Y$, having different phases and levels are obtained so that a resultant signal of these signals, equal in magnitude and opposite in direction to the vehicle body magnetism $E_B$, cancels to zero the signal component of the vehicle body magnetism $E_B$ regardless of the vehicle body magnetism orientation.

Figure 4:
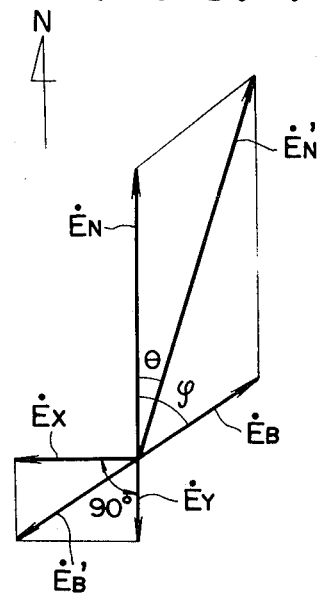
FIG. 4 is a vector diagram of the correction for the vehicle body magnetism according to the present invention.

FIG. 4 is a vector diagram of the cancellation of the signal component of the vehicle body magnetism.

In FIG. 4, a vector $\dot{E}_B$ of the signal component by the vehicle body magnetism is assumed to be at an angle $\phi$ with respect to a vector $E_N$, the geo-magnetic field when the vehicle is oriented to the north. In such an instance the alternating signal from the signal generator 17 has a resultant vector $\dot{E}_N'$, formed by the vector combination of vectors $\dot{E}_N$ and $\dot{E}_B$; signal $\dot{E}_N'$ is at a phase angle (the directional error) with respect to the vector $\dot{E}_N$.

At the time signal $E_N'$ is derived, vectors $\dot{E}_X$ and $\dot{E}_Y$ are set by means of the two variable resistors 15 and 16 so as to provide a resultant vector $\dot{E}_B'$, equal in magnitude and opposite in direction to the vector $\dot{E}_B$ of the vehicle body magnetism. Therefore, the resultant vector $\dot{E}_B'$ cancels the vector $\dot{E}_B$ of the vehicle body magnetism so that the vector $E_N$ of the geo-magnetic field is obtained. Therefore, the output signal from the adder 18 correctly indicates the direction of the geo-magnetic field. After the adjustment described above is made, the phase difference between the signals $\dot{E}_N$ and $\dot{E}_S$ gives the correct orientation. The phase between vectors $\dot{E}_X$ and $\dot{E}_Y$ with respect to the vector $\dot{E}_B$ of the earth magnetism is fixed and the vectors $\dot{E}_B'$, $\dot{E}_X$, and $\dot{E}_Y$ rotate relative to the vector $\dot{E}_N$ of the geo-magnetic field with the phase relationship fixed.

Figure 5:
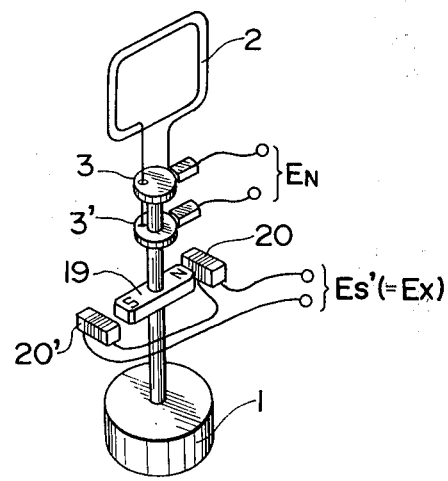
FIG. 5 is a perspective view of another geo-magnetism detecting section of a vehicle orientation detecting device of a second preferred embodiment according to the present invention.
Figure 6:
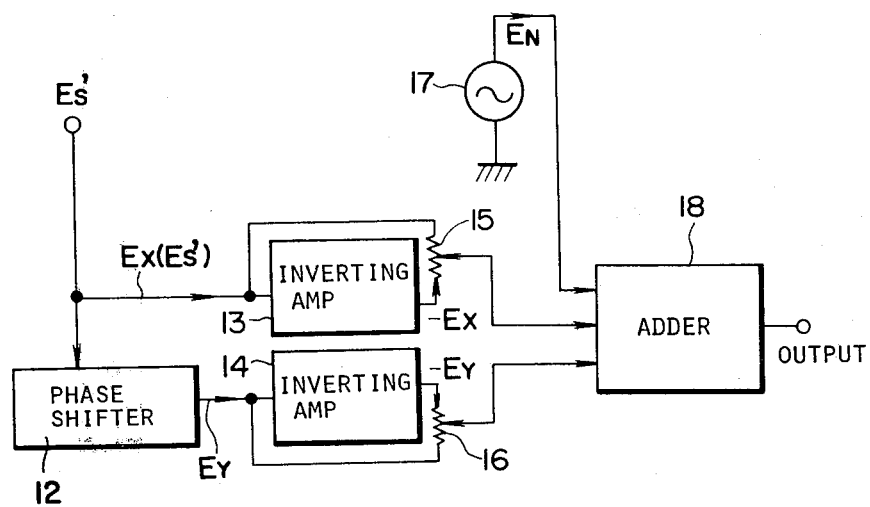
FIG. 6 is a block diagram of another internal circuit for canceling an error caused by the vehicle body magnetism of the second preferred embodiment connected to the geo-magnetism detecting section shown in FIG. 5.

FIG. 5 is a perspective view of a geo-magnetism detecting section of a second preferred embodiment of the present invention. In FIG. 5, a permanent magnet 19 is fixed to a rotating shaft attached to the coil wire 2. A pair of electromagnetic coils 20 and 20', having a single wire, are wound around cores in the opposite senses so that an alternating voltage signal $E_X$ is directly obtained. Therefore, as seen from FIG. 6 there need be no PLL circuit such as described in the first preferred embodiment shown in FIG. 3.

As described above, according to the present invention there is provided a circuit which supplies an alternating voltage signal having a period coincident with the interval of each turn of the geo-magnetism detecting coil and another alternating voltage signal have a 90° phase displacement from the alternating voltage signal for canceling the vehicle body magnetism electrically included in the geo-magnetism direction detecting signal. Consequently, the vehicle orientation detecting device is not susceptible to the aging and drift of a correction value due to the vibrations and change of temperature of the vehicle body. Furthermore, the cancellation adjustment can easily be made by means of two variable resistors for appropriately varying the voltage level of the alternating voltage signal. The correction can be made electrically so that this device can be installed at any position within the vehicle body.

After correcting the geo-magnetism direction detecting signal, the phase difference between the geo-magnetism direction detecting signal and alternating voltage signal when the corrected geo-magnetism direction detecting signal changes exhibits a polarity change is used for indicating the orientation of the vehicle.

It will be fully understood by those skilled in the art that the foregoing description is in terms of preferred embodiment of the present invention wherein various changes and modifications may be made without departing from the spirit and scope of the present invention, which is to be defined by the following claims.

What is claimed is:

1. A vehicle orientation detecting device for an automotive or other vehicles, comprising:
   (a) means including a rotating conductor for generating a first alternating voltage signal induced when said rotating conductor is rotated so as to intersect the geo-magnetic field;
   (b) means for generating a second alternating voltage signal having a period equal to an interval of one turn of said rotating conductor; and
   (c) means for adjusting the second alternating voltage signal so as to cancel an erroneous signal component of the first alternating voltage signal derived from said first alternating voltage signal generating means so as to provide a normal alternating voltage signal in accordance with the direction of the geo-magnetic field when the vehicle is oriented to a predetermined direction.

whereby a correct indication of the vehicle orientation can be made on a basis of the phase difference between the normal alternating voltage signal and a second alternating voltage signal;

said adjusting means comprising:
   (a) a first inverting amplifier connected to said second alternating voltage signal generating means for shifting the phase of the second alternating voltage signal by 180°;
   (b) a first variable resistor connected between the input and output terminals of said first inverting amplifier for adjustably deriving the second alternating voltage signal as a voltage with absolute levels ranging from zero to the amplitude of the second alternating voltage signal and which switches in phase so it is the same and 180° out of phase with respect to that of the second alternating voltage signal;
   (c) a phase shifter connected to said second alternating voltage signal generating means for shifting the phase of the second alternating voltage signal by 90°;
   (d) a second inverting amplifier connected to said phase shifter for shifting the phase of the 90° phase shifted second alternating voltage signal by 180°;
   (e) a second variable resistor connected between the input and output terminals of said second inverting amplifier for adjustably deriving the 90° phase shifted second alternating voltage signal as a voltage with absolute levels ranging from zero to the amplitude of the second alternating voltage signal and which switches in phase so it is the same and 180° out of phase with respect to that of the 90° phase shifted alternating voltage signal; and
   (f) an adder connected to said first alternating voltage signal generating means and to the output terminals of said first and second inverting amplifiers for adding the output voltage signal from said first alternating voltage signal generating means to a resultant signal component of the adjusted output signals from said first and second variable resistors to obtain the normal alternating voltage signal when the vehicle is oriented to the predetermined direction.

2. A vehicle orientation detecting device as set forth in claim 1 wherein said second alternating voltage generating means comprises:
   (a) a rod-shaped permanent magnet attached to a shaft of said rotating conductor, the permanent magnet having two poles rotating with said rotating conductor; and
   (b) a wire wound around a core located in the vicinity of said rod-shaped permanent magnet for deriving the second alternating voltage signal in response to the magnetic field from said rod-shaped permanent magnet.

3. A vehicle orientation detecting device as set forth in claim 1 wherein said second alternating voltage signal generating means comprising:
   (a) means for generating a rectangular pulse signal having a repetition rate coinciding with an interval of one turn of said rotating conductor; and
   (b) means for deriving the second alternating voltage signal in response to the rectangular pulse signal from said rectangular pulse signal generating means so as to be synchronized with the generated rectangular pulse signal.

4. A vehicle orientation detecting device for an automotive or other vehicles, comprising:
   (a) means including a rotating conductor for generating a first alternating voltage signal induced when said rotating conductor is rotated so as to intersect the geo-magnetic field;
   (b) means for generating a second alternating voltage signal having a period equal to an interval of one turn of said rotating conductor; and
   (c) means for adjusting the second alternating voltage signal so as to cancel an erroneous signal component of the first alternating voltage signal derived from said first alternating voltage signal generating means so as to provide a normal alternating voltage signal in accordance with the direction of the geo-magnetic field when the vehicle is oriented to a predetermined direction, whereby a correct indication of the vehicle orientation can be made on a basis of the phase difference between the normal alternating voltage signal and second alternating voltage signal;

said second alternating voltage signal generating means comprising:
   (a) means for generating a rectangular pulse signal having a repetition rate coinciding with an interval of one turn of said rotating conductor; and
   (b) means for deriving the second alternating voltage signal in response to the rectangular pulse signal from said rectangular pulse signal generating means so as to be synchronized with the generated rectangular pulse signal.

5. A vehicle orientation detecting device as set forth in claim 3 or 4 wherein said rectangular pulse signal generating means comprises:
   (a) a semi-circular disc fixed on a rotating shaft for carrying said rotating conductor; and
   (b) a photo coupler disposed with said semi-circular disc positioned therebetween, the photo coupler deriving the rectangular pulse whenever said semi-circular disc passes through a light passage therebetween.

6. A vehicle orientation detecting device as set forth in claim 3 or 4 wherein said second alternating voltage signal deriving means comprises a phase-locked loop circuit.

7. A vehicle orientation detecting device for an automotive or other vehicles, comprising:
   (a) means including a rotating conductor for generating a first alternating voltage signal induced when said rotating conductor is rotated so as to intersect the geo-magnetic field;
   (b) means for generating a second alternating voltage signal having a period equal to an interval of one turn of said rotating conductor; and
   (c) means for adjusting the second alternating voltage signal so as to cancel an erroneous signal component of the first alternating voltage signal derived from said first alternating voltage signal generating means so as to provide a normal alternating voltage signal in acordance with the direction of the geo-magnetic field when the vehicle is oriented to a predetermined direction,
   whereby a correct indication of the vehicle orientation can be made on a basis of the phase difference between the normal alternating voltage signal and second alternating voltage signal;
   said adjusting means comprising:
      (a) a first inverting amplifier connected to said second alternating voltage signal generating means for shifting the phase of the second alternating voltage signal by 180°;
      (b) a first variable resistor connected between the input and output terminals of said first inverting amplifier for adjustably deriving the second alternating voltage signal as a voltage with absolute levels ranging from zero to the amplitude of the second alternating voltage signal and which switches in phase so it is the same and 180° out of phase with respect to that of the second alternating voltage signal;
      (c) a phase shifter connected to said second alternating voltage signal generating means for shifting the phase of the second alternating voltage signal by 90°;
      (d) a second inverting amplifier connected to said phase shifter for shifting the phase of the 90° phase shifted second alternating voltage signal by 180°;
      (e) a second variable resistor connected between the input and output terminals of said second inverting amplifier for adjustably deriving the 90° phase shifted second alternating voltage signal as a voltage with absolute levels ranging from zero to the amplitude of the second alternating voltage signal and which switches in phase so it is the same and 180° out of phase with respect to the 90° phase shifted second alternating voltage signal; and
      (f) a subtractor connected to said first alternating voltage signal generating means and to the output terminals of said first and second variable resistors for subtracting the derived second alternating voltage signal of said first variable resistor and the derived 90° phase shifted second alternating voltage signal of said second variable resistor from the first alternating voltage signal derived from said first alternating voltage signal generating means.

8. A vehicle orientation detecting device for an automotive vehicle, comprising:
   (a) means including a rotating conductor for generating a first alternating voltage signal induced when said rotating conductor is rotated so as to intersect the geo-magnetic field;
   (b) means for generating a second alternating voltage signal having a period equal to an interval of one turn of said rotating conductor; and
   (c) means for vectorially adjusting the second alternating voltage signal with the vehicle oriented in a predetermined direction;
   said adjusting means including:
      a first circuit for 180° phase shifting said second alternating voltage signal from the original phase of said second alternating voltage signal to derive a 180° phase-shifted second alternating voltage signal, a phase shifter for shifting the original phase of said second alternating voltage signal by 90°, and a second circuit for 180° phase shifting said 90° phase-shifted second alternating voltage signal from the phase of the output of said phase shifter to derive a 270° phase-shifted second alternating voltage signal, and
      means for controlling the relative amplitudes of the output signals derived by said first and second circuits so they are equal in amplitude and opposite in phase with respect to an erroneous signal component of said first alternating voltage signal;
      whereby the erroneous signal component of the first alternating voltage signal is cancelled by the resultant of the two signal and the phase of the first alternating voltage signal indicates the true orientation of the vehicle.

9. A vehicle orientation detecting device as set forth in claim 8, wherein
   said first and second circuits respectively comprise:
   first and second inverting amplifiers, the first amplifier connected to respond to said second alternating voltage signal generating means for shifting the phase of the second alternating voltage signal by 180°, the second amplifier connected to respond to said phase shifter for shifting the phase of the 90° phase shifted second alternating voltage signal by 180°;
   the means for controlling including first and second variable resistors respectively connected between the input and output terminals of said first and second inverting amplifiers, the first variable resistor having a tap at which is derived the second alternating voltage signal with a voltage having absolute levels ranging from zero to the amplitude of the second alternating voltage signal and which switches in phase so it is the same and 180° out of phase with respect to that of the second alternating voltage signal,
   the second variable resistor having a tap at which is derived the 90° phase shifted second alternating voltage signal with an absolute voltage level ranging from zero to the amplitude of the second alternating voltage signal and which switches in phase so it is the same and 180° out of phase with respect to that of the 90° phase shifted alternating voltage signal,
   said adjusting means further including:
      an adder connected to said first alternating voltage signal generating means and to the taps for adding the output voltage signal from said first alternating voltage signal generating means to a resultant signal component of the adjusted output signals from said first and second variable resistors to obtain a true alternating voltage signal with the vehicle oriented in the predetermined direction.

10. A vehicle orientation detecting device as set forth in claim 8 or 9 wherein said second alternating voltage signal generating means comprises;
   (a) means for generating a rectangular pulse signal having a repetition rate coinciding with an interval of one turn of said rotating conductor; and
   (b) means for deriving the second alternating voltage signal in response to the rectangular pulse signal from said rectangular pulse signal generating means so as to be synchronized with the generated rectangular pulse signal.

11. A vehicle orientation detecting device as set forth in claim 10 wherein said rectangular pulse signal generating means comprises:
   (a) a semi-circular disc fixed on a rotating shaft for carrying said rotating conductor; and
   (b) a photo coupler disposed with said semi-circular disc positioned therebetween the photo coupler deriving the rectangular pulse whenever said semi-circular disc passes through a light passage therebetween.

12. A vehicle orientation detecting device as set forth in claim 10 wherein said second alternating voltage signal deriving means comprises a phase-locked loop circuit.

13. A vehicle orientation detecting device as set forth in claim 9 wherein said second alternating voltage generating means comprises:
   (a) a rod-shaped permanent magnet attached to a shaft of said rotating conductor, the permanent magnet having two poles rotating with said rotating conductor; and
   (b) a wire wound around a core located in the vicinity of said rod-shaped permanent magnet for deriving the second alternating voltage signal in response to the magnetic field from said rod-shaped permanent magnet.

14. A vehicle orientation detecting device as set forth in claim 8, wherein
said first and second circuits respectively comprise:
first and second inverting amplifiers, the first amplifier connected to respond to said second alternating voltage signal generating means for shifting the phase of the second alternating voltage signal by 180°, the second amplifier connected to respond to said phase shifter for shifting the phase of the 90° phase shifted second alternating voltage signal by 180°;

the means for controlling including first and second variable resistors respectively connected between the input and output terminals of said first and second inverting amplifiers, the first variable resistor having a tap at which is derived the second alternating voltage signal with a voltage having absolute levels ranging from zero to the amplitude of the second alternating voltage signal and which switches in phase so it is the same and 180° out of phase with respect to that of the second alternating voltage signal, the second variable resistor having a tap at which is derived the 90° phase shifted second alternating voltage signal with an absolute voltage level ranging from zero to the amplitude of the second alternating voltage signal and which switches in phase so it is the same and 180° out of phase with respect to that of the 90° phase shifted alternating voltage signal, wherein said adjusting means further includes:
a subtractor connected to said first alternating voltage signal generating means and to the taps of said first and second variable resistors for subtracting the second alternating voltage signal derived from said first variable resistor and the 90° phase shifted second alternating voltage signal derived from said second variable resistor from the first alternating voltage signal derived from said first alternating voltage signal generating means.

* * * * *